(12) United States Patent
Kyou (10) Patent No.: US 10,511,949 B2
(45) Date of Patent: *Dec. 17, 2019

(54) WIRELESS COMMUNICATION DEVICE, ELECTRONIC WATCH, WIRELESS COMMUNICATION METHOD, AND NON-TRANSITORY RECORDING MEDIUM

(71) Applicant: CASIO COMPUTER CO., LTD., Tokyo (JP)

(72) Inventor: Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,890

(22) Filed: Jun. 5, 2019

(65) Prior Publication Data

US 2019/0289449 A1 Sep. 19, 2019

Related U.S. Application Data

(63) Continuation of application No. 15/905,898, filed on Feb. 27, 2018.

(30) Foreign Application Priority Data

Mar. 16, 2017 (JP) ................. 2017-051785

(51) Int. Cl.
*H04W 4/80* (2018.01)
*H04L 29/08* (2006.01)
(Continued)

(52) U.S. Cl.
CPC ............... *H04W 4/80* (2018.02); *H04L 67/34* (2013.01); *H04M 1/7253* (2013.01);
(Continued)

(58) Field of Classification Search
CPC ............... H04W 4/80; H04W 52/0267; H04W 52/0277; H04M 1/7253; H04M 1/72569; H04M 2250/12; H04L 67/34
(Continued)

(56) References Cited

U.S. PATENT DOCUMENTS

2006/0041729 A1* 2/2006 Rider ...................... G06F 1/206
711/165
2017/0071056 A1* 3/2017 Stoev ................... H05K 1/0212
(Continued)

FOREIGN PATENT DOCUMENTS

JP 2001-078258 A 3/2001

OTHER PUBLICATIONS

Office Action dated Jan. 8, 2019 received in U.S. Appl. No. 15/905,898.
(Continued)

*Primary Examiner* — Edward F Urban
*Assistant Examiner* — Angelica M Perez
(74) *Attorney, Agent, or Firm* — Scully Scott Murphy & Presser (57) ABSTRACT

The electronic watch of an embodiment includes a receiver that receives data from a smart phone, a temperature sensor that detects a temperature of the electronic watch, a memory that stores rewriting target data, and a processor. The processor determines whether the rewriting target data stored in the memory is rewritable with data expected to be received from the smartphone based on the temperature of the electronic watch detected by the temperature sensor.

3 Claims, 7 Drawing Sheets

(51) Int. Cl.
*H04M 1/725* (2006.01)
*H04W 52/02* (2009.01)

(52) U.S. Cl.
CPC ... *H04M 1/72569* (2013.01); *H04W 52/0267* (2013.01); *H04M 2250/12* (2013.01); *H04W 52/0277* (2013.01)

(58) Field of Classification Search
USPC .............................................. 455/41.1–41.3
See application file for complete search history.

(56) References Cited

U.S. PATENT DOCUMENTS

| | | | |
|---|---|---|---|
| 2017/0289155 A1 | 10/2017 | Kerai | |
| 2018/0018160 A1* | 1/2018 | Teraoka | B60R 16/02 |
| 2018/0046402 A1* | 2/2018 | Vogan | G11C 16/10 |
| 2018/0270291 A1* | 9/2018 | Burton | H04L 67/06 |

OTHER PUBLICATIONS

Notice of Allowance dated May 21, 2019 received in U.S. Appl. No. 15/905,898.

* cited by examiner

| REWRITING TARGET DATA | CLOCK ROM DATA | | GPS MAP DATA, GPS FIRM DATA | |
|---|---|---|---|---|
| STATE INFORMATION | T ≥ 15° C | T < 15° C | BATTERY LEVEL EQUAL TO OR HIGHER THAN EARLY M AND T ≥ 15° C. | BATTERY LEVEL LOWER THAN EARLY M OR T < 15° C. |
| CONTENT OF NOTICE | There are rewriting data. Please connect to the electronic watch. | There are rewriting data. Please connect to the electronic watch in environment where the temperature is 15° C or higher. | There are rewriting data. Please connect to the electronic watch. | There are rewriting data. Please connect to the electronic watch in environment where the clock battery level is h or higher and the temperature is 15° C or higher. |

WIRELESS COMMUNICATION DEVICE, ELECTRONIC WATCH, WIRELESS COMMUNICATION METHOD, AND NON-TRANSITORY RECORDING MEDIUM

CROSS-REFERENCE TO RELATED APPLICATION

This application is a continuation application of U.S. patent application Ser. No. 15/905,898 filed on Feb. 27, 2018, which claims priority to Japanese Patent Application No. 2017-051785, filed on Mar. 16, 2017, the entire disclosure of U.S. patent application Ser. No. 15/905,898 and the entire disclosure of Japanese Patent Application No. 2017-051785 are incorporated by reference herein.

FIELD

This application relates generally to a wireless communication device, an electronic watch, a wireless communication method, and a non-transitory recording medium.

BACKGROUND

In the prior art, among techniques for rewriting software saved in a memory, there is a technique for a software supply device to receive from a wireless terminal device version information of control software of the wireless terminal device, determine whether update is necessary, and download new control software to the wireless terminal device when update is necessary (For example, see Unexamined Japanese Patent Application Kokai Publication No. 2001-78258).

In the software update as disclosed in the above patent literature, an attempt to rewrite software of a portable electronic device having a relatively small battery capacity such as an electronic wristwatch has the risk of data rewriting operation being cut off before the operation is completed depending on the remaining battery level or the state of the electronic device such as the temperature of the electronic device.

SUMMARY

A wireless communication device, an electronic watch, a wireless communication method, and a non-transitory recording medium are disclosed.

In order to achieve the above objective, a preferable embodiment comprises:

a receiver that receives data from another wireless communication device;

a sensor that detects a temperature of the wireless communication device;

a memory that stores predetermined data; and a processor, wherein the processor determines whether the predetermined data stored in the memory is rewritable with data expected to be received from the another wireless communication device based on the temperature of the wireless communication device detected by the sensor.

Moreover, another preferable embodiment comprises:

a communicator that wirelessly communicates with another wireless communication device; and a processor, wherein the processor controls the communicator to receive from the another wireless communication device a determination result presenting whether predetermined data stored in the another wireless communication device is rewritable based on a temperature of the another wireless communication device, and controls the communicator to transmit to the another wireless communication device data to rewrite the predetermined data when the received determination result presents allowance of rewriting.

BRIEF DESCRIPTION OF THE DRAWINGS

A more complete understanding of this application can be obtained when the following detailed description is considered in conjunction with the following drawings, in which.

DETAILED DESCRIPTION

An embodiment will be described below based on the drawings.

Figure 1:
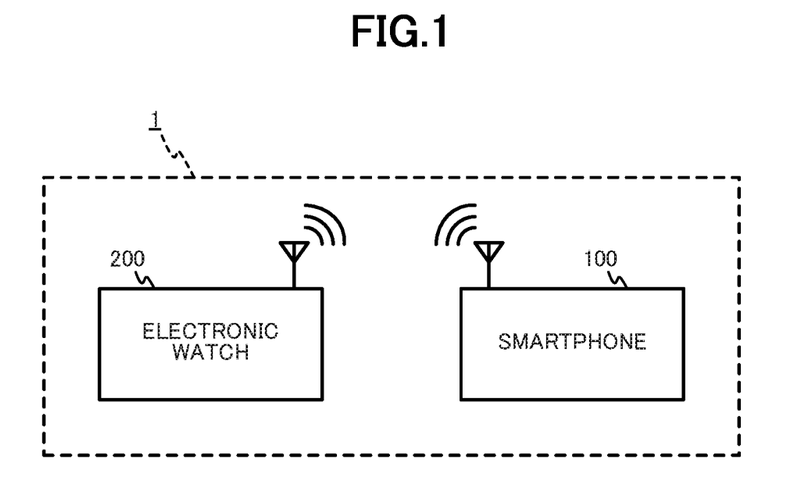
FIG. 1 is an illustration showing an exemplary configuration of the wireless communication system according to an embodiment.

FIG. 1 is an illustration presenting an exemplary configuration of a wireless communication system 1 according to an embodiment of the present disclosure. In the exemplary configuration shown in FIG. 1, the wireless communication system 1 comprises a smartphone 100 and an electronic watch 200. The smartphone 100 and the electronic watch 200 mutually wirelessly communicate based on Bluetooth (registered trademark) low energy (the BLE hereafter). The BLE is a standard (mode) designed for low energy consumption in the short-range wireless communication standard called Bluetooth (registered trademark). In this embodiment, the smartphone 100 operates as the master and the electronic watch 200 operates as the slave based on the BLE during wireless communication after connection between the smartphone 100 and the electronic watch 200 is established.

The configuration of the smartphone 100 according to the embodiment will be described next.

Figure 2:
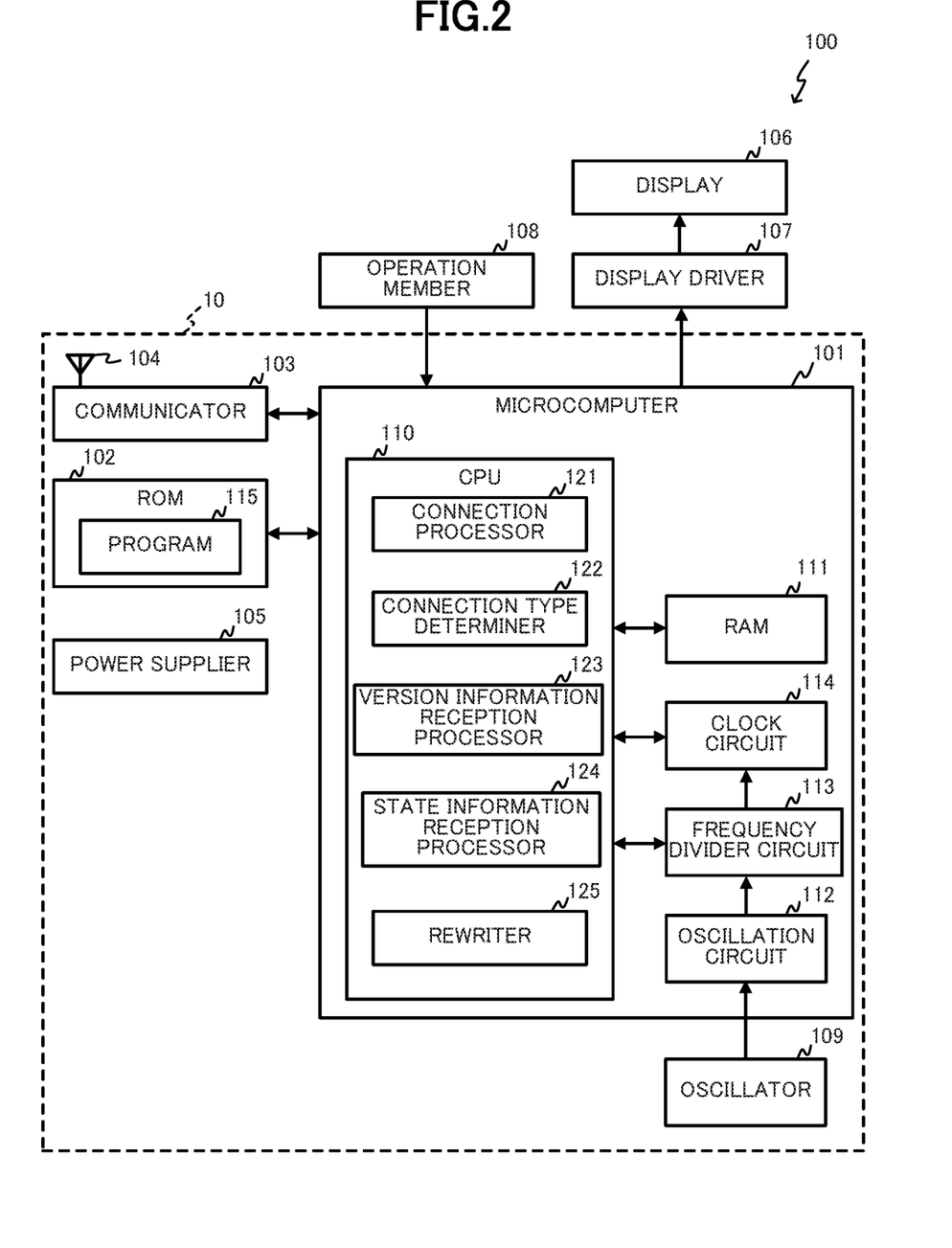
FIG. 2 is a block diagram showing the configuration of the smartphone according to the embodiment.

First, the hardware configuration of the smartphone 100 according to the embodiment will be described. FIG. 2 is a block diagram showing the configuration of the smartphone 100 according to an embodiment of the present disclosure. The smartphone 100 comprises a microcomputer 101, a read only memory (ROM) 102, a communicator 103, an antenna 104, a power supplier 105, a display 106, a display driver 107, an operation member 108, and an oscillator 109.

The microcomputer 101 comprises a central processing unit (CPU) 110 as a processor, a random access memory (RAM) 111 as a memory, an oscillation circuit 112, a frequency divider circuit 113, and a clock circuit 114. Here, the RAM 111, the oscillation circuit 112, the frequency divider circuit 113, and the clock circuit 114 are not necessarily provided within the microcomputer 101 and may be provided outside the microcomputer 101. Moreover, the ROM 102, the communicator 103, the power supplier 105, the display driver 107, and the oscillator 109 are not necessarily provided outside the microcomputer 101 and may be provided within the microcomputer 101.

The CPU 110 is a processor executing various kinds of arithmetic processing to collectively control the entire smartphone 100. The CPU 110 reads control programs from the ROM 102 and loads the control programs on the RAM 111 so as to execute various kinds of operational processing such as display of the time and arithmetic control and display regarding various functions. Moreover, the CPU 110 controls the communicator 103 to conduct data communication with the electronic watch 200.

The RAM 111 is a volatile memory such as a static random access memory (SRAM) or a dynamic random access memory (DRAM). The RAM 111 provides a work memory space to the CPU 110 to store temporary data and stores various setting data.

The oscillation circuit 112 creates and outputs a given frequency signal (a clock signal) by oscillating the oscillator 109. As the oscillation circuit 212, for example, a crystal oscillator is used.

The frequency divider circuit 113 divides the frequency signal entered by the oscillation circuit 112 into signals of a frequency used by the clock circuit 114 and the CPU 110, and outputs the signals. The frequency of the output signals may be changed based on settings by the CPU 110.

The clock circuit 114 calculates the current time by counting the number of times of input of a given clock signal entered by the frequency divider circuit 113 and adding the number to an initial value. The clock circuit 114 may be configured by software changing a value stored in the RAM 111 or configured by a dedicated counter circuit. The time calculated by the clock circuit 114 may be any of the cumulative time from a given time, the coordinated universal time (UTC), a preset local time, and the like. Moreover, the time calculated by the clock circuit 114 does not need to be retained in the format of year, month, day, hours, minutes, and seconds. Moreover, the time calculated by the clock circuit 114 can be corrected by the time obtained from an external source such as Wi-Fi (registered trademark).

The oscillation circuit 112, the frequency divider circuit 113, and the clock circuit 114 constitute a counter.

The ROM 102 is a mask ROM, a nonvolatile rewritable memory, or the like, and stores control programs and initial setting data. The control programs include a program 115 regarding control of various kinds of processing for rewriting the rewriting target data stored in the electronic watch 200 and described later.

The communicator 103 comprises, for example, a transmitter and a receiver, a transceiver, or a radio frequency (RF) communication circuit, a baseband (BB) circuit, a memory circuit, and other circuits. The communicator 103 demodulates and decodes radio signals received via the antenna 104 and sends them to the CPU 110. Moreover, the communicator 103 encodes and modulates signals sent by the CPU 110 and transmits them outside via the antenna 104.

The power supplier 105 comprises a battery and supplies electric power regarding operation of the smartphone 100 to the parts at their operation voltage. As the battery of the power supplier 105, in this embodiment, a secondary battery such as a lithium ion battery is used.

The above microcomputer 101, the ROM 102, the communicator 103, the antenna 104, the power supplier 105, and the oscillator 109 constitute a wireless communication device 10.

The display 106 comprises a display screen, for example a liquid crystal display (LCD) or an organic EL display. The display driver 107 outputs to the display 106 drive signals corresponding to the display screen type based on control signals from the CPU 110 for display on the display screen.

The operation member 108 receives input operation from the user and outputs to the CPU 110 an electric signal corresponding to the input operation as an input signal. For example, as the operation member 108, a touch sensor may be superimposed on the display screen of the display 106 to constitute a touch panel together with the display screen. In such a case, the touch sensor detects a contact position and/or a contact mode regarding a touch operation of the user to the touch sensor and outputs to the CPU 110 an operation signal corresponding to the detected contact position and/or contact mode.

The functional configuration of the CPU 110 of the smartphone 100 according to the embodiment will be described next.

The CPU 110 functions as a connection processor 121, a connection type determiner 122, a version information reception processor 123, a state information reception processor 124, and a rewriter 125. The functions of the connection processor 121, the connection type determiner 122, the version information reception processor 123, the state information reception processor 124, and the rewriter 125 may be realized by a single CPU or may be realized by their individual CPUs. Moreover, their functions may be realized by a processor other than the microcomputer 101 such as the CPU of the communicator 103 or the like.

The CPU 110 as the connection processor 121 controls the communicator 103 to control connection to the electronic watch 200. For example, the CPU 110 controls the communicator 103 to execute scanning for receiving an advertising packet from the electronic watch 200. Then, receiving from the communicator 103 notice of reception of an advertising packet from the electronic watch 200, the CPU 110 orders the communicator 103 to transmit a connection request to the electronic watch 200. The above-described transmission/reception of an advertising packet/processing from the start of scanning to the establishment of connection is called the connection sequence. In this embodiment, the CPU 110 executes the rewriting procedure operation described later during the connection sequence. Moreover, the CPU 110 orders the communicator 103 to transmit a disconnection request to the electronic watch 200, for example, when reception of data from the electronic watch 200 is finished or when an order to end communication with the electronic watch 200 is received from the user via the operation member 108 after connection to the electronic watch 200 is established.

The connection type determiner 122 determines the type of connection to the electronic watch 200 (the connection type) corresponding to the purpose of connection to the electronic watch 200. In this embodiment, the following connection types are preset:

(1) Find Me: connection for searching for a wireless terminal device located nearby;

(2) KEY time adjustment: connection for time adjustment triggered by a user operation for correcting the time of the electronic watch 200 to the time of the smartphone 100;

(3) automatic time adjustment: connection for time adjustment with preset timing (for example, a given time of the day) for correcting the time of the electronic watch 200 to the time of the smartphone 100; and (4) manual connection: connection to the electronic watch 200 that is manually started by the user.

In this embodiment, the CPU 110 determines in the connection sequence which one of the above types (1) to (4) the connection type is. If the connection type is either the Find Me or the KEY time adjustment, the CPU 110 determines that rewriting is unnecessary and returns to the connection sequence without executing the rewriting procedure described later. In other words, when the user selects the Find Me or the KEY time adjustment, presumably, the user wishes prompt connection to the electronic watch 200 and in such a case, the CPU 110 advances the connection sequence without executing the rewriting procedure.

The CPU 110 as the version information reception processor 123 controls the communicator 103 to receive version information presenting the version of predetermined data (rewriting target data) stored in the electronic watch 200. In this embodiment, the rewriting target data are the following data:

(a) daylight saving time (DST)-related data: data including DST rules for defining the DST-effective period;

(b) clock ROM data: data for software for controlling the counter of the electronic watch 200;

(c) GPS map data: data including map data used by the GPS module 216 of the electronic watch 200 and associated time difference information; and (d) GPS firm data: data for firmware for operating the GPS module 216 of the electronic watch 200.

In this embodiment, the CPU 110 receives current version information of the above rewriting target data (a) to (d) from the electronic watch 200.

The CPU 110 as the state information reception processor 124 controls the communicator 103 to receive state information presenting the state of the electronic watch 200. In this embodiment, the state information is information presenting the remaining amount of the battery 205 provided to the electronic watch 200 and the temperature of the electronic watch 200.

The CPU 110 as the rewriter 125 controls the communicator 103 to receive a determination result presenting whether it is allowable to rewrite the rewriting target data stored in the electronic watch 200 based on the state information of the electronic watch 200, and when the received determination result presents allowance of rewriting, controls the communicator 103 to transmit to the electronic watch 200 data to rewrite the rewriting target data (rewriting data).

Specifically, first, the CPU 110 determines whether the connection type determined by the connection type determiner 122 is a rewriting-unnecessary connection type, in other words whether the connection type is the Find Me or the KEY time adjustment. If determined that the connection type is the Find Me or the KEY time adjustment, the CPU 110 advances the connection sequence without executing the rewriting procedure.

On the other hand, if determined that the connection type determined by the connection type determiner 122 is not the Find Me or the KEY time adjustment, the CPU 110 determines whether the versions of the above rewriting target data (a) to (d) presented by the version information received by the version information reception processor 123 are their latest versions. If determined that the versions of the rewriting target data (a) to (d) are all their latest versions, the CPU 110 advances the connection sequence without executing the rewriting procedure.

On the other hand, if determined that the version of the DST-related data is not the latest version, the CPU 110 transmits the latest version data of the DST-related data as rewriting data to the electronic watch 200 via the communicator 103 for the electronic watch 200 to execute the rewriting procedure.

Figure 3:
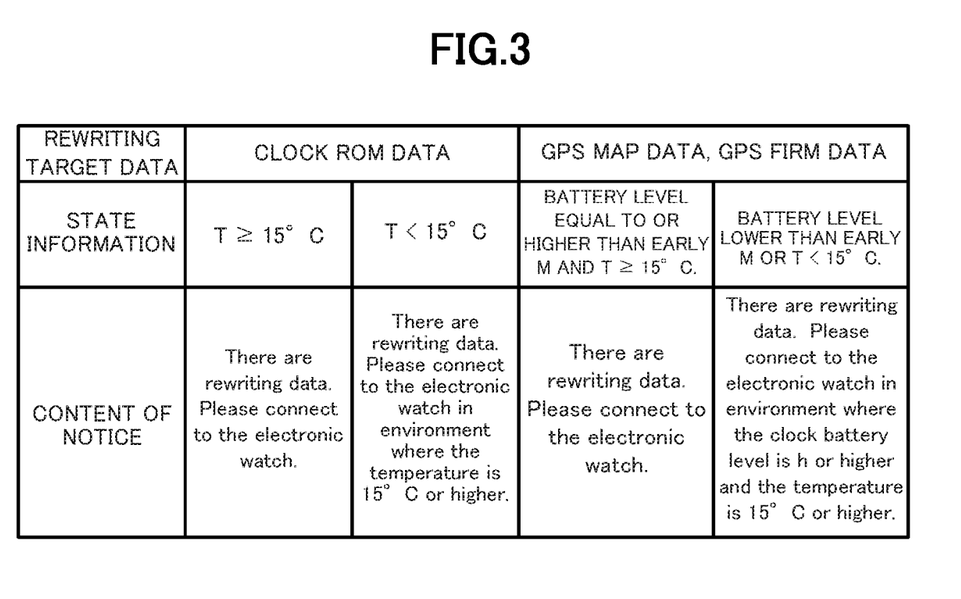
FIG. 3 is a chart showing exemplary contents of the notice displayed according to the rewriting target data and the state of the electronic watch.

Moreover, if determined that any of the versions of the rewriting target data (b) to (d) is not the latest version and if the connection type is the automatic time adjustment and the current time falls on the first automatic time adjustment during daytime hours (for example, 9:00 to 21:00 local time), the CPU 110 displays on the display 106 notice of necessity of connection to urge the user to connect to the electronic watch 200. Moreover, if it is not in daytime hours or if it is in daytime hours but not the first time adjustment, the CPU 110 returns to the connection sequence without displaying the notice. FIG. 3 shows exemplary contents of the notice displayed on the display 106 according to the rewriting target data and the state of the electronic watch 200 presented by the state information. In the example shown in FIG. 3, for example, if determined that the clock ROM data are not of the latest version and the temperature T of the electronic watch is lower than 15° C., the CPU 110 displays on the display 106 notice including a message like "There are rewriting data. Please connect to the electronic watch in an environment where the temperature is 15° C. or higher". Moreover, for example, if determined that the GPS map data are not of the latest version and the remaining amount of the battery 205 (the battery level) is lower than early M or the temperature T of the electronic watch 200 is lower than 15° C., the CPU 110 displays on the display 106 notice including a massage like "There are rewriting data. Please connect to the electronic watch in an environment where the battery level of the electronic watch is H or higher and the temperature is 15° C. or higher". Here, the remaining amount of the battery 205 is presented by preset ranges such as low (L), early middle (M), mid-M, late M, and high (H) in the order of remaining amount from low to high.

Moreover, if determined that any of the versions of the rewriting target data (b) to (d) is not the latest version and if the connection type is the manual connection and the electronic watch 200 is in the rewritable state and the user permits rewriting, the CPU 110 executes the rewriting procedure. For example, if determined that any of the versions of the rewriting target data (b) to (d) is not the latest version and the connection type is the manual connection, the CPU 110 controls the communicator 103 to transmit a rewriting start command for starting rewriting to the electronic watch 200. Then, the CPU 110 controls the communicator 103 to receive a result of determination as to whether rewriting is allowable by the electronic watch 200 having received the rewriting start command, and if the received determination result presents allowance of rewriting, displays on the display 106 notice for making the user select whether to execute the rewriting. For example, the CPU 110 displays on the display 106 a message "There are rewriting data. Would you like to rewrite?" and buttons with which "YES" or "NO" can be selected. In doing so, the CPU 110 may include in the message an estimated time necessary for rewriting the rewriting target data. Then, when an operation to select the button "YES" is received via the operation member 108, the CPU 110 controls the communicator 103 to transmit the rewriting data to the electronic watch 200. On the other hand, when an operation to select the button "NO" is received via the operation member 108 or when no operation to select the button "YES" or "NO" is received within a given time (or example, 30 seconds), the CPU 110 advances the connection sequence without executing the rewriting procedure. On the other hand, if the received determination result presents disallowance of rewriting and its reason, the CPU 110 displays notice presenting the content of the determination result on the display 106. For example, if the received determination result presents disallowance of rewriting of the clock ROM data because the temperature of the electronic watch 200 is lower than 15° C., the CPU 110 display on the display 106 notice including a message "An environment where the temperature is 15° C. or higher is necessary for rewriting data".

The configuration of the electronic watch 200 according to the embodiment will be described next.

Figure 4:
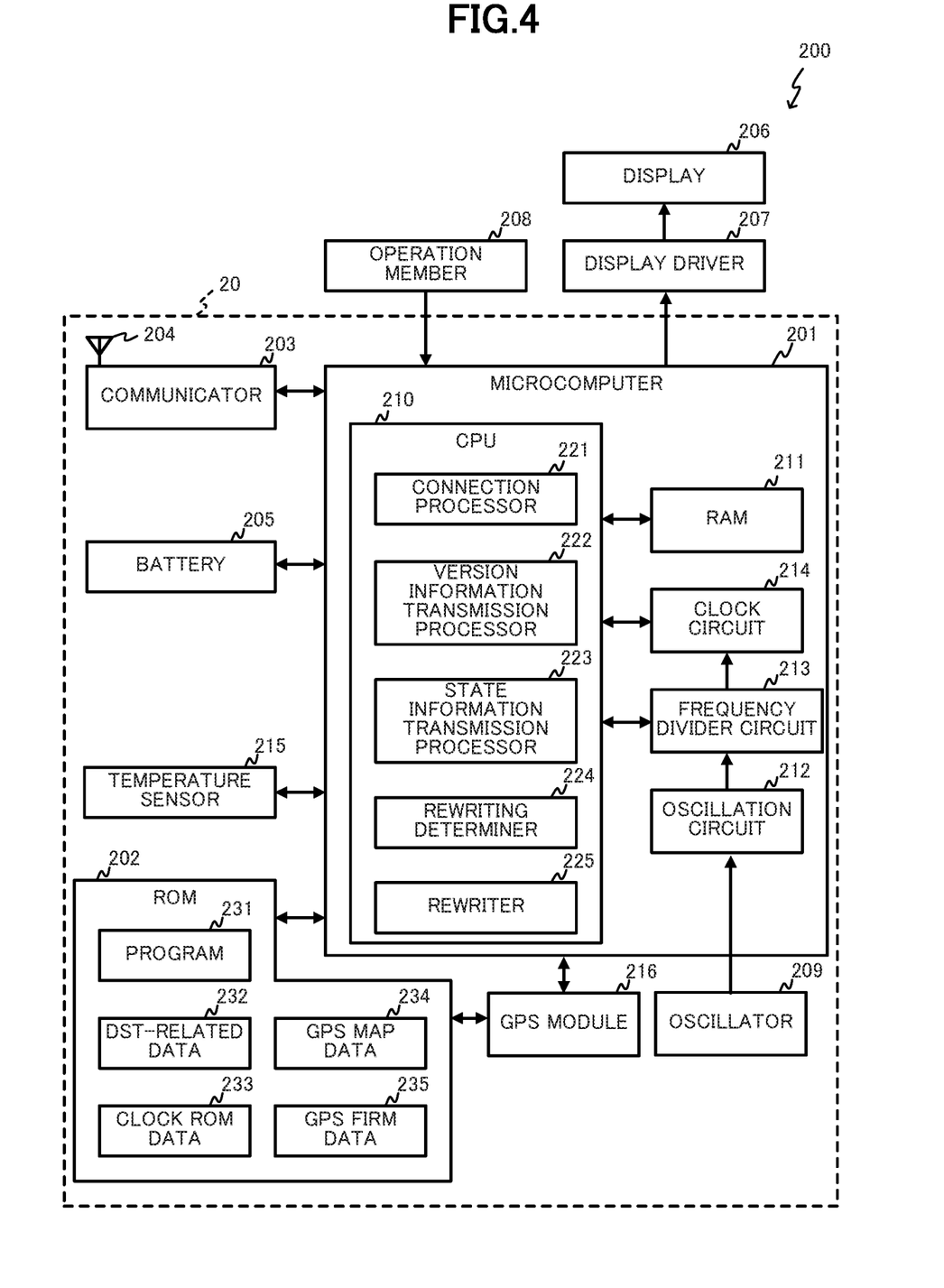
FIG. 4 is a block diagram showing the configuration of the electronic watch according to the embodiment.

First, the hardware configuration of the electronic watch 200 according to the embodiment will be described. FIG. 4 is a block diagram showing the configuration of the electronic watch 200 according to an embodiment of the present disclosure. The electronic watch 200 comprises a microcomputer 201, a ROM 202, a communicator 203, an antenna 204, a battery 205, a display 206, a display driver 207, an operation member 208, an oscillator 209, a temperature sensor 215, and a GPS module 216.

The microcomputer 201 comprises a CPU 210, a RAM 211 as a memory, an oscillation circuit 212, a frequency divider circuit 213, a clock circuit 214, and the like. Here, the RAM 211, the oscillation circuit 212, the frequency divider circuit 213, and the clock circuit 214 are not necessarily provided within the microcomputer 201 and may be provided outside the microcomputer 201. Moreover, the ROM 202, the display driver 207, the battery 205, the oscillator 209, the communicator 203, and the antenna 204 are not necessarily provided outside the microcomputer 201 and may be provided within the microcomputer 201.

The CPU 210 is a processor executing various kinds of arithmetic processing to collectively control the entire electronic watch 200. The CPU 210 reads control programs from the ROM 202 and loads the control programs on the RAM 211 so as to execute various kinds of operational processing such as display of the time and arithmetic control and display regarding various functions. Moreover, the CPU 210 controls the communicator 203 to conduct data communication with the smartphone 100.

The RAM 211 is a volatile memory such as an SRAM or a DRAM. The RAM 211 provides a work memory space to the CPU 210 to store temporary data and stores various kinds of setting data.

The oscillation circuit 212 creates and outputs a given frequency signal (a clock signal) by oscillating the oscillator 209. As the oscillation circuit 212, for example, a crystal oscillator is used.

The frequency divider circuit 213 divides the frequency signal entered by the oscillation circuit 212 into signals of a frequency used by the clock circuit 214 and the CPU 210, and outputs the signals. The frequency of the output signals may be changed based on settings by the CPU 210.

The clock circuit 214 calculates the current time by counting the number of times of input of a given clock signal entered by the frequency divider circuit 213 and adding the number to an initial value. The clock circuit 214 may be configured by software changing a value stored in the RAM 211 or configured by a dedicated counter circuit. The time calculated by the clock circuit 214 may be any of the cumulative time from a given time, the UTC, the time of a preset city (local time), and the like. Moreover, the time calculated by the clock circuit 114 does not need to be retained in the format of year, month, date, hour, minute, and second. Moreover, the time calculated by the clock circuit 214 can be changed by an order from the CPU 210 as described later.

The oscillation circuit 212, the frequency divider circuit 213, and the clock circuit 214 constitute a counter.

The ROM 202 is a nonvolatile rewritable memory such as a flash memory and stores control programs and initial setting data. The control programs include a program 231 regarding control of various kinds of processing for executing rewriting of the rewriting target data stored in the ROM 202. Moreover, the ROM 202 stores DST-related data 232, clock ROM data 233, GPS map data 234, and GPS firm data 235 as the above-described rewriting target data.

The communicator 203 comprises, for example, a transmitter and a receiver, a transceiver, or a radio frequency communication circuit, a baseband circuit, a memory circuit, and other circuits. The communicator 203 demodulates and decodes radio signals received via the antenna 204 and sends them to the CPU 210. Moreover, the communicator 203 encodes and modulates signals sent by the CPU 210 and transmits them outside via the antenna 204.

The battery 205 supplies electric power regarding operation of the electronic watch 200 to the parts at their operation voltage. As the battery 205, in this embodiment, a primary battery such as a button-type dry-cell battery is used. Alternatively, it may be possible to use a secondary battery as the battery 205 and charge/discharge the secondary battery according to the level of electromotive force corresponding to the incident light to a solar panel (not shown) provided to the electronic watch 200.

The above microcomputer 201, the ROM 202, the communicator 203, the antenna 204, the battery 205, and the oscillator 209 constitute a wireless communication device 20.

The display 206 comprises a display screen, for example a liquid crystal display or an organic EL display, and conducts digital display operation to display the time and/or data regarding various functions by either the dot matrix system or the segment system, or their combination. The display driver 207 outputs to the display 206 drive signals corresponding to the display screen type based on control signals from the CPU 210 for display on the display screen. Alternatively, the display 206 may have an analog configuration rotating multiple hands by a stepping motor via a train of gears for display.

The operation member 208 receives input operation from the user and outputs to the CPU 210 an electric signal corresponding to the input operation as an input signal. The operation member 208 includes, for example, a push-button switch and a winding crown. Alternatively, as the operation member 208, a touch sensor may be superimposed on the display screen of the display 206 and constitute a touch panel together with the display screen. In such a case, the touch sensor detects a contact position and/or a contact mode regarding a touch operation of the user to the touch sensor and outputs to the CPU 210 an operation signal corresponding to the detected contact position and/or contact mode.

The temperature sensor 215 detects the temperature of the electronic watch 200 and outputs an electric signal corresponding to the detected temperature to the CPU 210. The temperature sensor 215 comprises a temperature sensor such as a thermistor and detects, for example, the temperature inside the casing of the electronic watch 200. Here, when a lithium ion battery is used as the battery 205, the temperature sensor 215 may be a thermistor provided within the lithium ion battery. In such a case, the temperature sensor 215 detects the temperature of the lithium ion battery and outputs an electric signal corresponding to the detected temperature to the CPU 210.

The GPS module 216 is a module receiving GPS electric waves from a GPS satellite and measuring the time and the location of its own device based on the received GPS electric waves. In this embodiment, the GPS module 216 operates based on the GPS firm data 235 stored in the ROM 202. Moreover, the location of its own device measured by the GPS module 216 is displayed on the display 206 along with the GPS map data 234 stored in the ROM 202.

The functional configuration of the CPU 210 of the electronic watch 200 according to the embodiment will be described next.

As shown in FIG. 4, the CPU 210 functions as a connection processor 221, a version information transmission processor 222, a state information transmission processor 223, a rewriting determiner 224, and a rewriter 225. The functions of the connection processor 221, the version information transmission processor 222, the state information transmission processor 223, the rewriting determiner 224, and the rewriter 225 may be realized by a single CPU or may be realized by their individual CPUs. Moreover, their functions may be realized by a processor other than the microcomputer 201 such as the CPU of the communicator 203 or the like.

The CPU 210 as the connection processor 221 controls the communicator 203 to control connection to the smartphone 100. For example, the CPU 210 controls the communicator 203 to execute transmission of an advertising packet for letting the smartphone 100 know presence of the electronic watch 200. Moreover, receiving a connection request from the smartphone 100 and receiving notice of establishment of connection from the communicator 203, the CPU 210 orders the communicator 203 to stop transmission of an advertising packet.

The CPU 210 as the version information transmission processor 222 controls the communicator 203 to transmit to the smartphone 100 version information presenting the versions of the rewriting target data stored in the ROM 202. Specifically, the CPU 210 transmits to the smartphone 100 version information presenting the versions of the rewriting target data (1) to (4) stored in the ROM 202.

The CPU 210 as the state information transmission processor 223 controls the communicator 203 to transmit to the smartphone 100 state information presenting the state of the electronic watch 200. In this embodiment, the CPU 210 acquires the remaining amount of the battery 205 and the temperature of the electronic watch 200 detected by the temperature sensor 215. Then, the CPU 210 transmits to the smartphone 100 state information presenting the remaining amount of the battery 205 and the temperature of the electronic watch 200.

The CPU 210 as the rewriting determiner 224 determines whether it is allowable to rewrite the rewriting target data stored in the ROM 202 with rewriting data expected to be received from the smartphone 100 based on the remaining amount of the battery 205 and the temperature of the electronic watch 200 detected by the temperature sensor 205.

For example, the CPU 210 determines for each of the rewriting target data (b) to (d) whether at least either of the remaining amount of the battery 205 and the temperature of the electronic watch 200 presented by the state information satisfies a rewritable condition (a rewriting state condition). Here, the rewriting state condition on the remaining amount of the battery 205 and the temperature of the electronic watch 200 is preset for each of the rewriting target data (b) to (d). Moreover, the CPU 210 determines whether the rewriting regions of the ROM 202 corresponding to the rewriting target data (b) to (d) are deleted. For example, when the rewriting state condition for the clock ROM data 233 is that the temperature of the electronic watch 200 is 15° C. or higher, the CPU 210 determines that the rewriting is allowable if the detected temperature of the electronic watch 200 is 15° C. or higher and the rewriting region corresponding to the clock ROM data 233 is deleted. On the other hand, the CPU 210 determines that the rewriting is disallowable if the detected temperature of the electronic watch 200 is lower than 15° C. or the rewriting region corresponding to the clock ROM data 233 is undeleted. Moreover, for example, when the rewriting state condition for the GPS map data 234 and the GPS firm data 235 is that the temperature of the electronic watch 200 is 15° C. or higher and the remaining amount of the battery 205 is the H or higher, the CPU 210 determines that the rewriting is allowable if the detected temperature of the electronic watch 200 is 15 C.° or higher and the remaining amount of the battery 205 is the H or higher and if the rewriting region corresponding to the GPS map data 234 and the GPS firm data 235 is deleted. On the other hand, the CPU 210 determines that the rewriting is disallowable if the detected temperature of the electronic watch 200 is lower than 15 C.° or the remaining amount of the battery 205 is lower than the H or if the rewriting region corresponding to the GPS map data 234 and the GPS firm data 235 is undeleted.

Then, if determined that it is allowable to rewrite the rewriting target data, the CPU 210 controls the communicator 203 to transmit to the smartphone 100 a determination result presenting allowance of rewriting of the rewriting target data. On the other hand, if determined that the rewriting is disallowable, the CPU 210 controls the communicator 203 to transmit to the smartphone 100 a determination result presenting that the predetermined data is non-rewritable and a reason thereof. The CPU 210 transmits information presenting, for example, the temperature of the electronic watch 200 being low, the battery 205 being at a low voltage, or the rewriting region of the ROM 202 corresponding to the rewriting target data being undeleted as the reason.

The CPU 210 as the rewriter 225 executes the rewriting procedure according to a rewriting order from the smartphone 100. For example, the CPU 210 controls the communicator 203 to receive rewriting data from the smartphone 100 and rewrites the rewriting target data in the ROM 202 with the received data.

Figure 5:
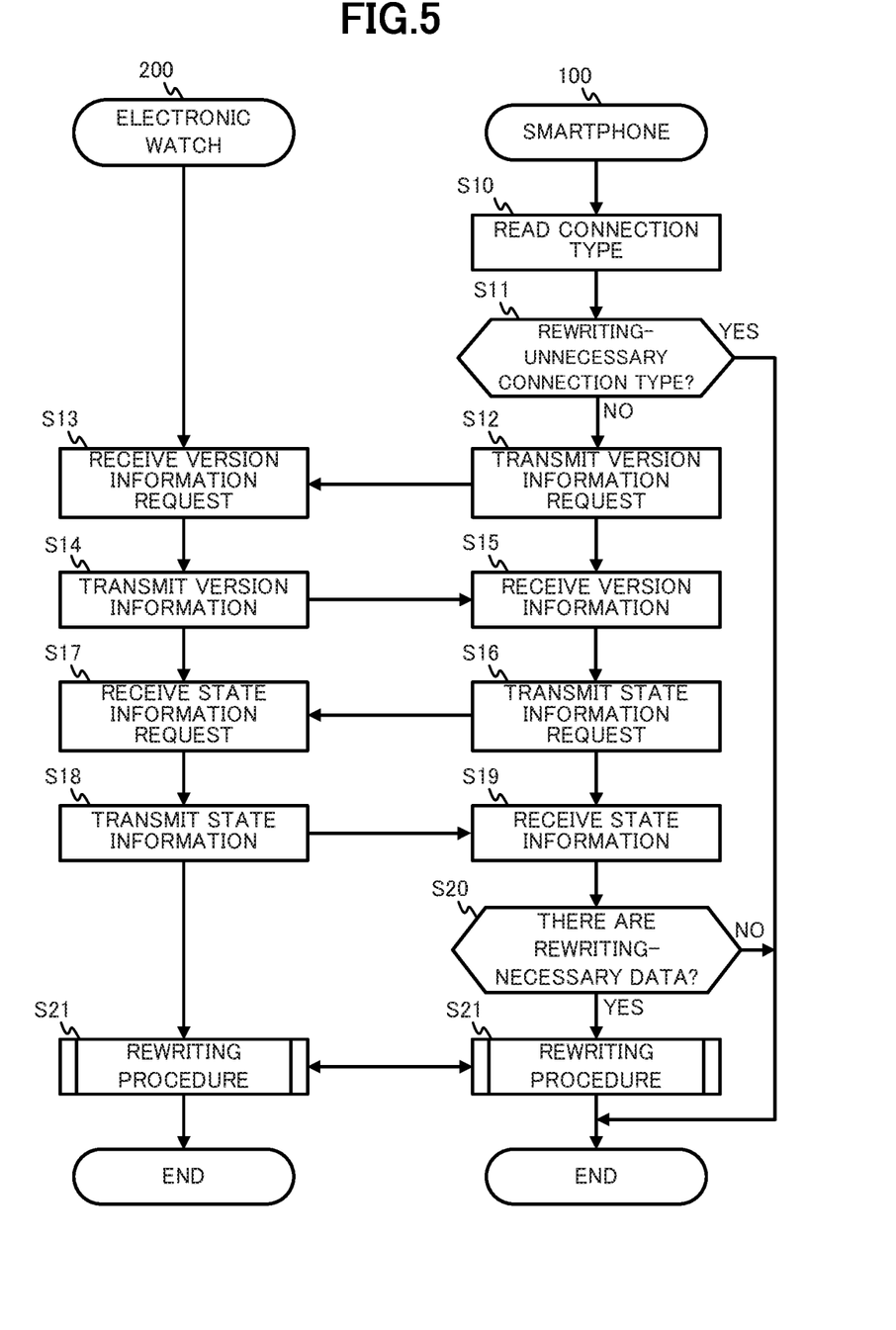
FIG. 5 is a sequence chart showing the rewriting procedure operation of the wireless communication system according to the embodiment.

FIG. 5 is a sequence chart showing an example of the rewriting procedure operation of the wireless communication system 1 in this embodiment. In the example shown in FIG. 5, operation executed by the CPU 110 of the smartphone 100 and the CPU 210 of the electronic watch 200 during the connection sequence will be described.

The CPU 110 of the smartphone 100 and the CPU 220 of the electronic watch 200 start the rewriting procedure operation shown in FIG. 5, for example, with given timing in the connection sequence.

First, the CPU 110 of the smartphone 100 reads the connection type in the currently ongoing connection sequence (Step S10). Then, the CPU 110 determines whether the read connection type is a rewriting-unnecessary connection type, specifically either the Find Me or the KEY time adjustment (Step S11). If the read connection type is a rewriting-unnecessary connection type (Step S11; Yes), the CPU 110 ends the rewriting procedure operation and advances the connection sequence.

If the read connection type is not a rewriting-unnecessary connection type (Step S11; No), the CPU 110 controls the communicator 103 to transmit to the electronic watch 200 a version information request requesting transmission of version information presenting the versions of the rewriting target data (Step S12). Then, the CPU 210 of the electronic watch 200 controls the communicator 203 to receive the version information request (Step S13) and transmit to the smartphone 100 version information of the rewriting target data stored in the ROM 202 (Step S14). Then, the CPU 110 of the smartphone 100 controls the communicator 103 to receive the version information from the electronic watch 200 (Step S15).

Furthermore, the CPU 110 controls the communicator 103 to transmit a state information request requesting transmission of state information of the electronic watch 200 (Step S16). Then, the CPU 210 of the electronic watch 200 controls the communicator 203 to receive the state information request (Step S17) and transmit to the smartphone 100 state information presenting the detected remaining amount of the battery 205 and the detected temperature of the electronic watch 200 (Step S18). Then, the CPU 110 of the smartphone 100 controls the communicator 103 to receive the state information from the electronic watch 200 (Step S19).

The CPU 110 determines whether there are data that need to be rewritten among the rewriting target data based on the received version information (Step S20). Specifically, if any of the versions presented by the received version information is not the latest version, the CPU 110 determines that the rewriting target data regarding that version are data that need to be rewritten. If there are no data that need to be rewritten (Step S20; No), the CPU 110 ends the rewriting procedure operation and advances the connection sequence. On the other hand, if there are data that need to be rewritten (Step S20; Yes), the CPU 110 of the smartphone 100 and the CPU 210 of the electronic watch 200 execute the rewriting procedure (Step S21).

Figure 6:
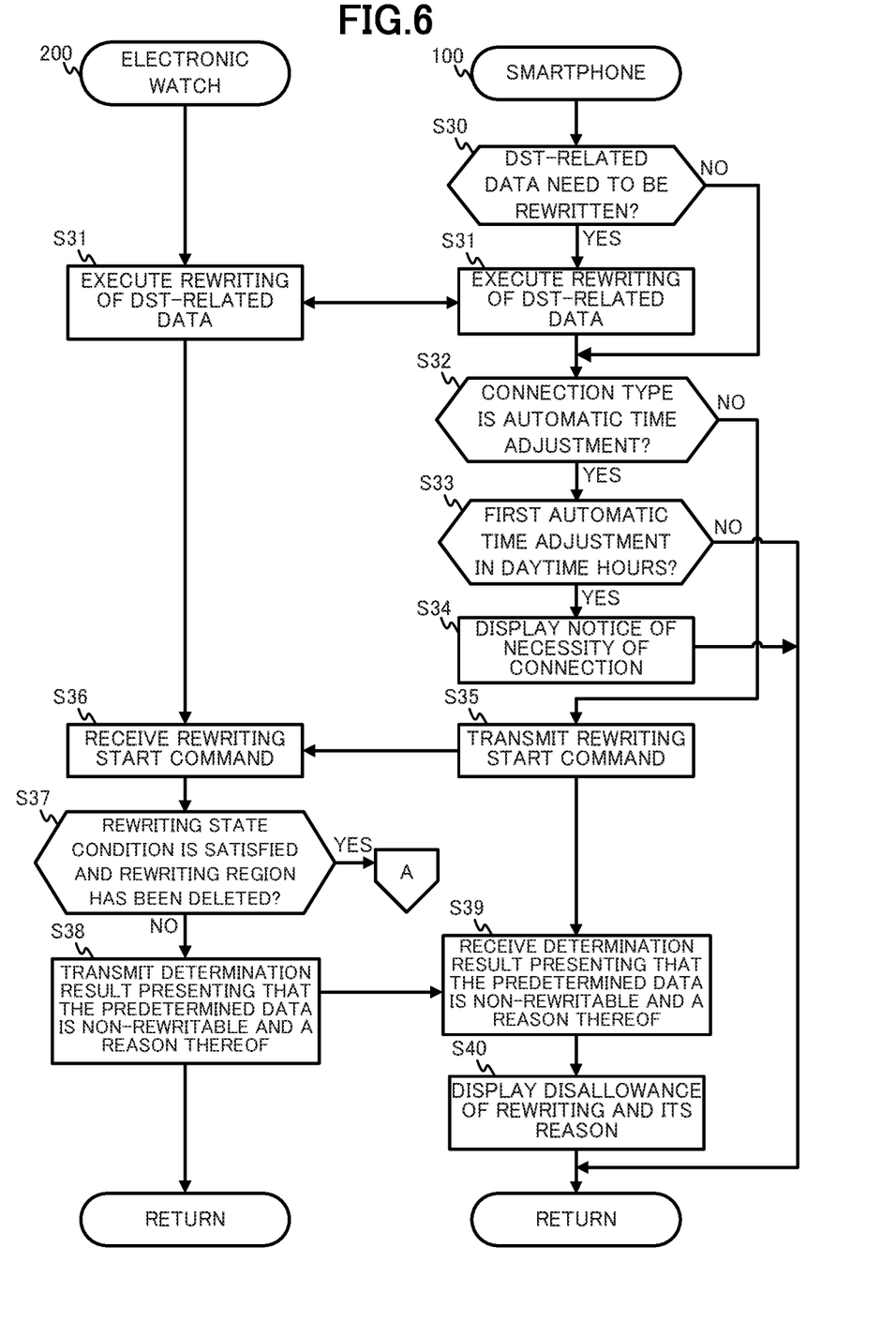
FIG. 6 is a sequence chart showing the rewriting procedure operation of the wireless communication system according to the embodiment.
Figure 7:
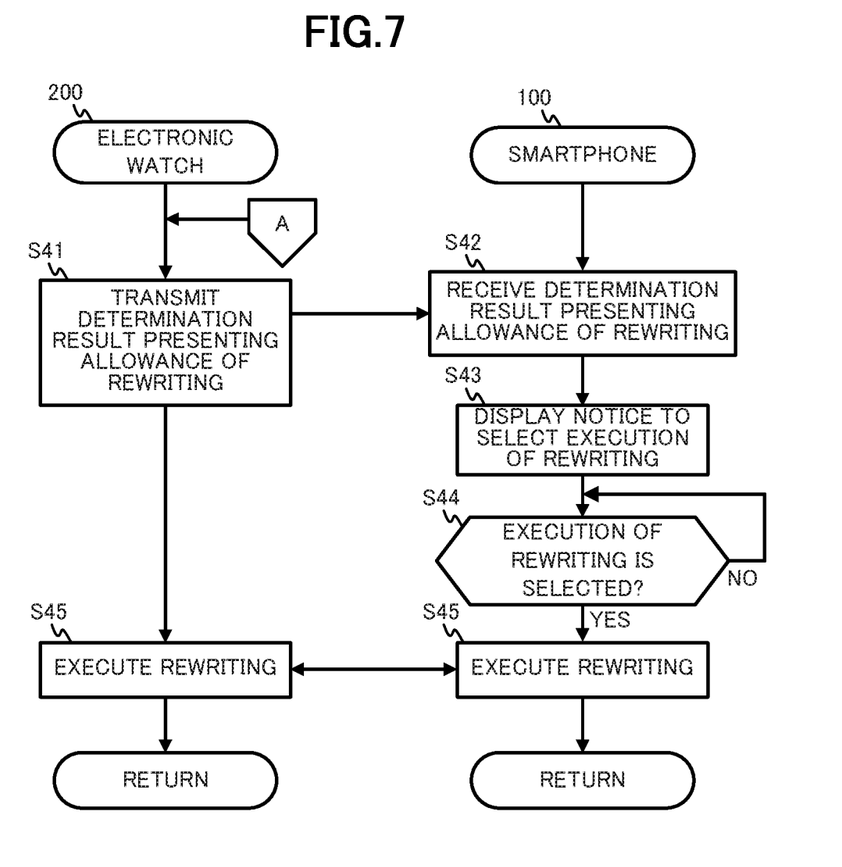
FIG. 7 is a sequence chart showing the rewriting procedure operation of the wireless communication system according to the embodiment.

FIGS. 6 and 7 are sequence charts showing an example of the rewriting procedure of the wireless communication system 1 shown in the Step S21 of FIG. 5.

The CPU 110 of the smartphone 100 determines whether the DST-related data need to be rewritten (Step S30). If the DST-related data need to be rewritten (Step S30; Yes), the CPU 110 executes rewriting of the DST-related data together with the CPU 210 of the electronic watch 200 (Step S31).

If the DST-related data do not need to be rewritten (Step S30; No) or after finishing rewriting of the DST-related data, the CPU 110 determines whether the connection type is the automatic time adjustment (Step S32). If the connection type is the automatic time adjustment (Step S32; Yes), the CPU 110 determines whether the current time is in daytime hours (for example, between 9:00 and 21:00 local time) and this is the first automatic time adjustment (Step S33). If the current time is in daytime hours and this is the first automatic time adjustment (Step S33; Yes), the CPU 110 displays on the display 106 notice of necessity of connection (Step S34). If the current time is in daytime hours and this is not the first automatic time adjustment (Step S33; No) or after displaying the notice, the CPU 110 ends the rewriting procedure operation and advances the connection sequence.

If the connection type is not the automatic time adjustment (Step S32; No), the CPU 110 determines that the connection type is the manual connection and controls the communicator 103 to transmit to the electronic watch 200 a rewriting start command requesting to start execution of rewriting of rewriting target data that need to be rewritten (Step S35).

Receiving the rewriting start command (Step S36), the CPU 210 of the electronic watch 200 determines whether the state information of the electronic watch 200 satisfies the rewritable condition of the rewriting target data that need to be rewritten and their rewriting region has been deleted (Step S37).

If the state information of the electronic watch 200 does not satisfy the rewritable condition of the rewriting target data that need to be rewritten or their rewriting region has not been deleted (Step S37; No), the CPU 210 controls the communicator 203 to transmit to the smartphone 100 a determination result presenting that the predetermined data is non-rewritable and a reason thereof (Step S38). The CPU 110 of the smartphone 100 controls the communicator 103 to receive the determination result presenting that the predetermined data is non-rewritable and a reason thereof (Step S39), and displays on the display 106 notice presenting the content of the received determination result (Step S40). Then, the CPU 110 of the smartphone 100 and the CPU 210 of the electronic watch 200 end the rewriting procedure operation and advance the connection sequence.

On the other hand, if the state information of the electronic watch 200 satisfies the rewritable condition of the rewriting target data that need to be rewritten and their rewriting region has been deleted (Step S37; Yes), as shown in FIG. 7, the CPU 210 controls the communicator 203 to transmit to the smartphone 100 a determination result presenting allowance of rewriting (Step S41). The CPU 110 of the smartphone 100 controls the communicator 103 to receive the determination result presenting allowance of rewriting (Step S42), and displays on the display 106 notice for making the user to select whether to execute the rewriting (Step S43).

Then, the CPU 110 determines whether an operation to select execution of the rewriting is received via the operation member 108 (Step S44). If an operation to select execution of the rewriting is received (Step S44; Yes), the CPU 110 of the smartphone 100 and the CPU 210 of the electronic watch 200 execute rewriting of the rewriting target data that need to be rewritten (Step S45). On the other hand, if an operation to select execution of the rewriting is not received (Step S44; No), the CPU 110 of the smartphone 100 and the CPU 210 of the electronic watch 200 end the rewriting procedure operation and advance the connection sequence.

As described above, the CPU 210 of the electronic watch 200 according to this embodiment determines whether it is allowable to rewrite the rewriting target data stored in the ROM 202 with rewriting data expected to be received from the smartphone 100 based on the temperature of the electronic watch detected by the temperature sensor 215. Moreover, the CPU 110 of the smartphone 100 according to this embodiment receives a determination result from the electronic watch 200 and when the received determination result presents allowance of rewriting, controls the communicator 103 to transmit rewriting data to the electronic watch 200. Therefore, it is possible to prevent the rewriting from being cut off because of an improper temperature of the electronic watch 200 beforehand and properly execute the rewriting of data.

Moreover, the CPU 210 of the electronic watch 200 according to this embodiment determines whether it is allowable to rewrite the rewriting target data with rewriting data expected to be received from the smartphone 100 based on the remaining amount of the battery 205 in addition to the temperature of the electronic watch detected by the temperature sensor 215. Therefore, it is possible to prevent the rewriting from being cut off because of an insufficient remaining amount of the battery 205 of the electronic watch 200 beforehand and properly execute the rewriting of data.

Moreover, the CPU 210 of the electronic watch 200 according to this embodiment determines that it is allowable to rewrite the rewriting target data with rewriting data expected to be received from the smartphone 100 when the temperature of the electronic watch 200 detected by the temperature sensor 215 and the remaining amount of the battery 205 satisfy rewriting state conditions preset according to the rewriting target data. Therefore, it is possible to set proper rewriting state conditions according to the rewriting target data such as rewriting target data volumes and properly execute the rewriting of data for each of the rewriting target data.

Moreover, when the processor determines that the predetermined data is non-rewritable, the CPU 210 of the electronic watch 200 according to this embodiment controls the communicator 203 to transmit to the smartphone 100 a determination result presenting that the predetermined data is non-rewritable and a reason thereof. Therefore, when the processor determines that the predetermined data is non-rewritable, the smartphone 100 can notify the user so and urge the user to put the electronic watch 200 in a rewritable state.

The present disclosure is not confined to the above-described embodiment and various changes can be made.

For example, in the above embodiment, an exemplary case is described in which the CPU 210 of the electronic watch 200 determines whether it is allowable to rewrite the rewriting target data based on the temperature of the electronic watch 200. However, the CPU 110 of the smartphone 100 may determine whether it is allowable to rewrite the rewriting target data instead of the CPU 210 of the electronic watch 200.

Specifically, the CPU 210 of the electronic watch 200 controls the communicator 203 to transmit to the smartphone 100 state information presenting the temperature of the electronic watch 200 detected by the temperature sensor 215. Then, the CPU 110 of the smartphone 100 controls the communicator 103 to receive from the electronic watch 200 the state information presenting the temperature of the electronic watch 200. Subsequently, the CPU 110 determines whether it is allowable to rewrite the rewriting target data stored in the ROM 202 of the electronic watch 200 with rewriting data expected to be received from the smartphone 100 based on the temperature of the electronic watch 200 presented by the received state information. Then, if determined that the rewriting is allowable, the CPU 110 controls the communicator 103 to transmit rewriting data to the electronic watch 200. Then, the CPU 210 of the electronic watch 200 rewrites the rewriting target data stored in the ROM 202 with the rewriting data transmitted by the smartphone 100.

From the above, as in the above-described embodiment, it is possible to prevent the rewriting from being cut off because of an improper temperature of the electronic watch 200 beforehand and properly execute the rewriting of data.

Furthermore, like the CPU 210 of the electronic watch 200 in the above-described embodiment, the CPU 110 of the smartphone 100 may receive state information presenting the remaining amount of the battery 205 in addition to the temperature of the electronic watch 200 detected by the temperature sensor 215 and determine whether it is allowable to rewrite the rewriting target data based on the temperature of the electronic watch 200 and the remaining amount of the battery 205 presented by the received state information.

Furthermore, like the CPU 210 of the electronic watch 200 in the above-described embodiment, the CPU 110 of the smartphone 100 may determine that the rewriting is allowable when the temperature of the electronic watch 200 and the remaining amount of the battery 205 satisfy rewriting state conditions preset according to the rewriting target data.

Furthermore, as in the above-described embodiment, when the processor determines that the predetermined data is non-rewritable, the CPU 110 of the smartphone 100 may display on the display 106 a determination result presenting that the predetermined data is non-rewritable and a reason thereof to give notice to the user.

Moreover, in the above-described embodiment, when the processor determines that the predetermined data is non-rewritable, the CPU 210 of the electronic watch 200 may further determine whether it is allowable to rewrite part of the rewriting target data. For example, when a partial rewiting state condition for allowing rewriting of some part of the rewriting target data is set and the temperature of the electronic watch 200 and the remaining amount of the battery 205 do not satisfy the rewriting state condition but satisfy the partial rewiting state condition, the CPU 210 determines whether it is allowable to rewrite that part of the rewriting target data and transmits the determination result to the smartphone 100. As a result, the CPU 110 of the smartphone 100 and the CPU 210 of the electronic watch 200 can execute rewriting of only part of the rewriting target data and execute rewriting of the rest of the rewriting target data later.

Moreover, in the above-described embodiment, the CPU 110 of the smartphone 100 and the CPU 210 of the electronic watch 200 execute the rewriting procedure operation during the connection sequence. However, the rewriting procedure operation may be executed after the connection is established. In such a case, for example, operation input to the operation member 108 of the smartphone 100 or operation input to the operation member 208 of the electronic watch 200 after the connection is established may trigger the CPU 110 and the CPU 210 to execute the rewriting procedure operation.

Moreover, in the above embodiment, an exemplary case is described in which the smartphone 100 and the electronic watch 200 communicate by Bluetooth (registered trademark). However, the smartphone 100 and the electronic watch 200 may communicate by some other communication method, for example a wireless local area network (LAN) or Wi-Fi (registered trademark).

Moreover, in the above embodiment, the smartphone 100 and the electronic watch 200 are used by way of example. However, the smartphone 100 and the electronic watch 200 may be various kinds of electronic devices such as smart watches. The present disclosure is preferable for portable electronic devices in which a relatively small capacity battery is mounted like the electronic watch 200.

Moreover, in the above embodiment, an exemplary case is described in which the CPUs 110 and 210 execute control operation. However, the control operation is not restricted to software control by CPUs. A hardware configuration such as a dedicated logic circuit may be used for partial or entire control operation.

Moreover, the above description is made using, by way of example, the ROMs 102 and 202 comprising a nonvolatile memory such as a flash memory as the non-transitory computer-readable medium storing the program regarding the data communication procedure and the program regarding the rewriting procedure of the present disclosure. However, the non-transitory computer-readable medium is not restricted to these and a portable non-transitory recording medium such as a hard disk drive (HDD), a compact disc read only memory (CD-ROM), and a digital versatile disc (DVD) is applicable. Moreover, carrier waves are applicable to the present disclosure as a medium providing data of the program according to the present disclosure via a communication line.

Additionally, specific details of the configurations, control proceedings, and exemplary displays shown in the embodiment can be changed as appropriate to the extent of not departing from the gist of the present disclosure.

Several embodiments of the present disclosure are described above. The scope of the present disclosure can be changed as appropriate to the extent of not departing from the gist of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device comprising:
a processor configured to:
control a communication circuit to receive, from another wireless communication device:
determination data indicating rewriting target data in a memory of the another wireless communication device is rewritable based on a determination that state information of the another wireless communication device, the state information comprising:
a value of a temperature of the another wireless communication device detected by a sensor; and
a value of a remaining amount of a battery,
satisfies one of a plurality of rewriting state conditions, the one of the plurality of rewriting state conditions being selected based on a type of the rewriting target data; and
determination data indicating the rewriting target data in the memory is not rewritable based on a determination that the state information of the another wireless communication device does not satisfy the one of the plurality of rewriting state conditions selected;
in response to receiving the determination data indicating that the rewriting target data is rewritable, control the communication circuit to transmit updated data to the another wireless communication device for rewriting the rewriting target data; and
in response to receiving the determination data indicating that the rewriting target data is not rewritable:
control the communication circuit to receive action data indicating action information on one or more actions to be taken to change the value of the temperature of the another wireless communication device, the value of the remaining amount of the battery, or both so that the state information satisfies the one of the plurality of rewriting state conditions selected; and
control a display to display the action information.

2. A wireless communication method for controlling a wireless communication device, the wireless communication method comprising:
controlling a communication circuit of the wireless communication device to receive, from another wireless communication device:
determination data indicating rewriting target data in a memory of the another wireless communication device is rewritable based on a determination that state information of the another wireless communication device, the state information comprising:
a value of a temperature of the another wireless communication device detected by a sensor; and
a value of a remaining amount of a battery,
satisfies one of a plurality of rewriting state conditions, the one of the plurality of rewriting state conditions being selected based on a type of the rewriting target data; and
determination data indicating the rewriting target data in the memory is not rewritable based on a determination that the state information of the another wireless communication device does not satisfy the one of the plurality of rewriting state conditions selected;
in response to receiving the determination data indicating that the rewriting target data is rewritable, controlling the communication circuit to transmit updated data to the another wireless communication device for rewriting the rewriting target data; and
in response to receiving the determination data indicating that the rewriting target data is not rewritable:
controlling the communication circuit to receive action data indicating action information on one or more actions to be taken to change the value of the temperature of the another wireless communication device, the value of the remaining amount of the battery, or both so that the state information satisfies the one of the plurality of rewriting state conditions selected; and
controlling a display to display the action information.

3. A non-transitory computer-readable storage medium on which a program is stored, wherein the program causes a computer of a wireless communication device to at least perform:
controlling a communication circuit to receive, from another wireless communication device:
determination data indicating rewriting target data in a memory of the another wireless communication device is rewritable based on a determination that state information of the another wireless communication device, the state information comprising:
a value of a temperature of the another wireless communication device detected by a sensor; and
a value of a remaining amount of a battery,
satisfies one of a plurality of rewriting state conditions, the one of the plurality of rewriting state conditions being selected based on a type of the rewriting target data; and
determination data indicating the rewriting target data in the memory is not rewritable based on a determination that the state information of the another wireless communication device does not satisfy the one of the plurality of rewriting state conditions selected;

in response to receiving the determination data indicating that the rewriting target data is rewritable, controlling the communication circuit to transmit updated data to the another wireless communication device for rewriting the rewriting target data; and in response to receiving the determination data indicating that the rewriting target data is not rewritable:

controlling the communication circuit to receive action data indicating action information on one or more actions to be taken to change the value of the temperature of the another wireless communication device, the value of the remaining amount of the battery, or both so that the state information satisfies the one of the plurality of rewriting state conditions selected; and controlling a display to display the action information.

* * * * *